United States Patent [19]
De Winter

[11] Patent Number: 6,071,619
[45] Date of Patent: Jun. 6, 2000

[54] METHOD AND SPRAY MOULD ASSEMBLY FOR MANUFACTURING AN ELASTOMERIC SKIN OF AT LEAST TWO ELASTOMERIC MATERIALS AND SUCH ELASTOMERIC SKIN

[75] Inventor: Hugo De Winter, Destelbergen, Belgium

[73] Assignee: Recticel, Brussels, Belgium

[21] Appl. No.: 08/750,175

[22] PCT Filed: Jun. 1, 1994

[86] PCT No.: PCT/BE94/00037

§ 371 Date: Mar. 17, 1997

§ 102(e) Date: Mar. 17, 1997

[87] PCT Pub. No.: WO95/32850

PCT Pub. Date: Dec. 7, 1995

[51] Int. Cl.[7] .............................. B29C 39/12; B05D 1/32
[52] U.S. Cl. ................ 428/423.1; 264/245; 264/255; 264/309; 425/130; 425/449; 425/470; 425/DIG. 50; 427/282; 428/42.2
[58] Field of Search ..................... 425/130, 449, 425/470, DIG. 50; 264/255, 245, 309; 427/282; 428/423.1, 423.3

[56] References Cited

U.S. PATENT DOCUMENTS

| | | | |
|---|---|---|---|
| 5,328,349 | 7/1994 | Minke et al. | 425/289 |
| 5,328,723 | 7/1994 | Horiki et al. | 427/272 |
| 5,370,831 | 12/1994 | Blair et al. | 264/24 |

FOREIGN PATENT DOCUMENTS

| | | |
|---|---|---|
| 0 307 005 | 4/1985 | European Pat. Off. . |
| 0 223 278 | 10/1986 | European Pat. Off. . |
| 0 392 186 | 3/1990 | European Pat. Off. . |
| 0 475 004 | 7/1991 | European Pat. Off. . |

OTHER PUBLICATIONS

Patent Abstracts of Japan; vol. 7 No. 145 (M–224) (1290) Jun. 24, 1983.
Patent Abstracts of Japan; vol. 9, No. 11 (M–351) (1734) Jan. 18, 1985.
Patent Abstracts of Japan; JP3055219, Mar. 11, 1991.
Patent Abstracts of Japan; JP2032819, Feb. 2, 1990.
Patent Abstracts of Japan; JP3124411, May 28, 1991.

*Primary Examiner*—Mathieu D. Vargot
*Assistant Examiner*—Suzanne E. Mason
*Attorney, Agent, or Firm*—Sughrue, Mion, Zinn, Macpeak & Seas, PLLC

[57] ABSTRACT

In the method according to the invention, as shown in the drawings, the elastomeric skin is manufactured in a mold assembly having a mold surface (2), a portion (3) of which is shielded off by means of a mask (4), a first elastomeric material (7) is sprayed on this mold surface (2), the mask (4) is removed, and a second elastomeric material (9) is sprayed on said portion (3) of the mold surface (2). The edges (11) of the mask (4) are placed on top of upstanding edges (13) of the mold surface (2) so that the transition between both elastomeric materials (7, 9) is achieved on these upstanding edges (13), i.e. in an outer recess of the elastomeric skin resulting in an aesthetic visual parting line. According to a further important aspect, the edges (11) of the mask (4) are maintained at a distance from the mold surface (2) such as to avoid contact between the layer of first elastomeric material (7) sprayed onto the mold surface (2) and the mask (4).

22 Claims, 3 Drawing Sheets

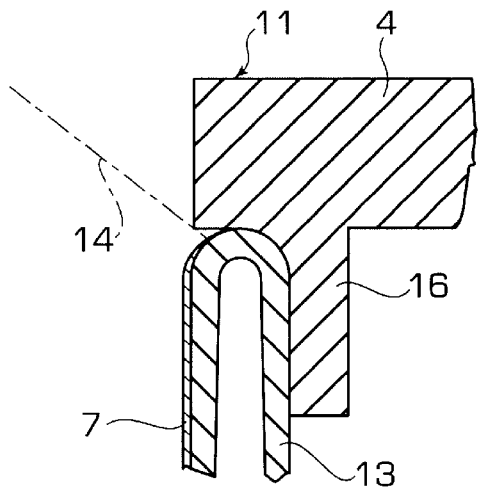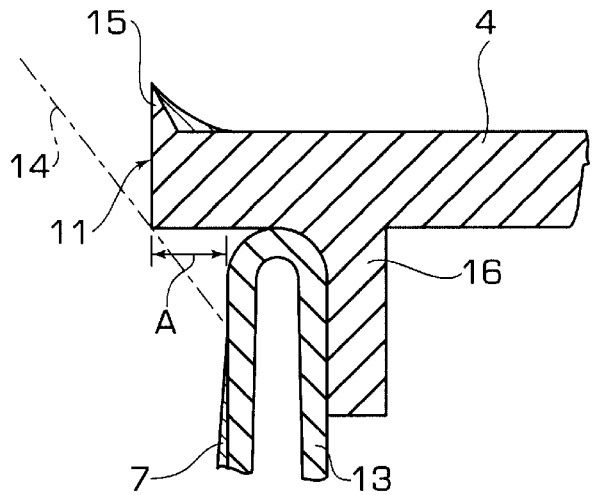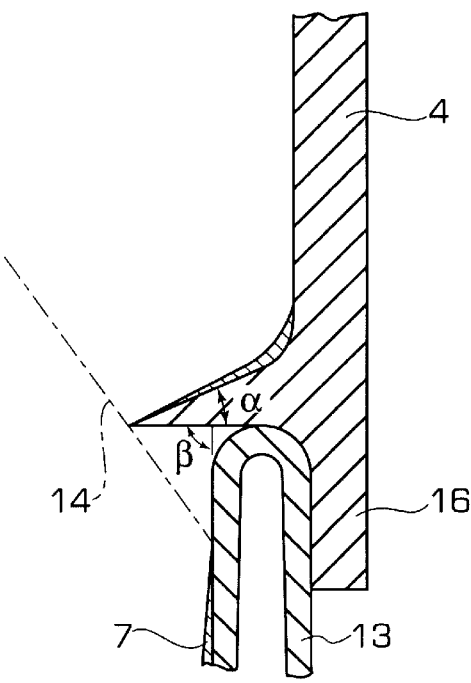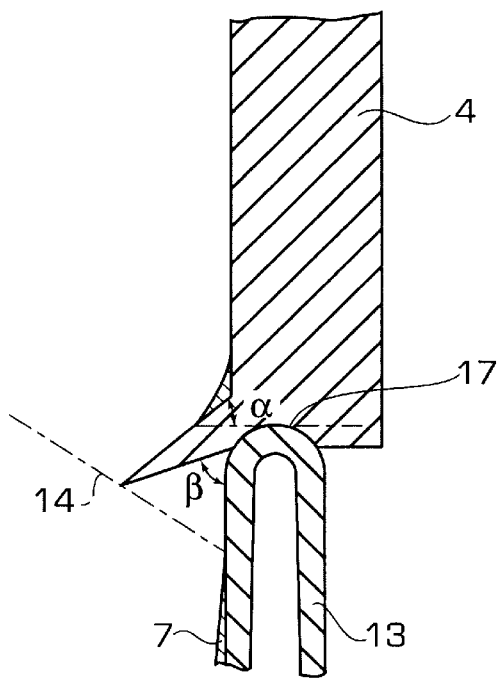

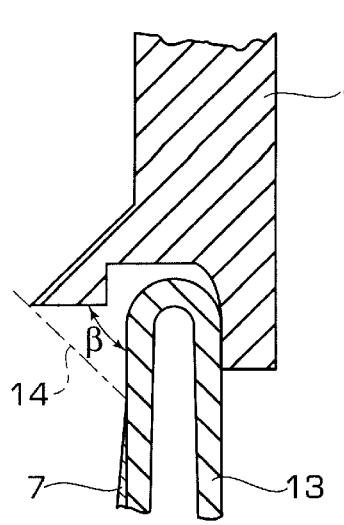
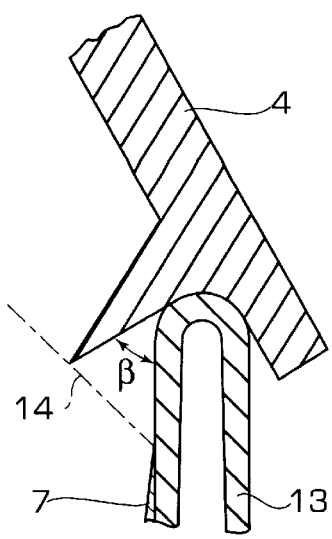
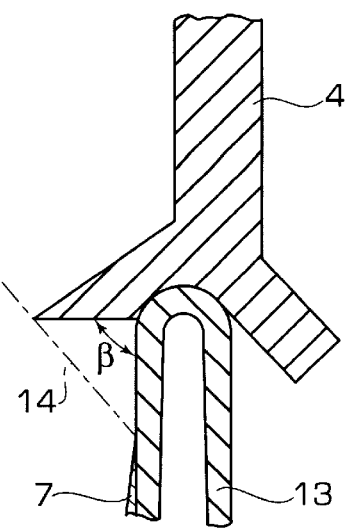
FIG. 7  FIG. 8  FIG. 9
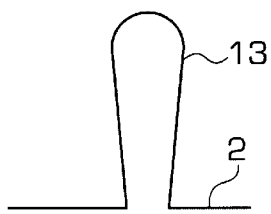
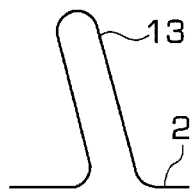
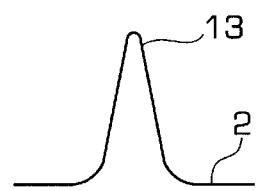
FIG. 10  FIG. 11  FIG. 12
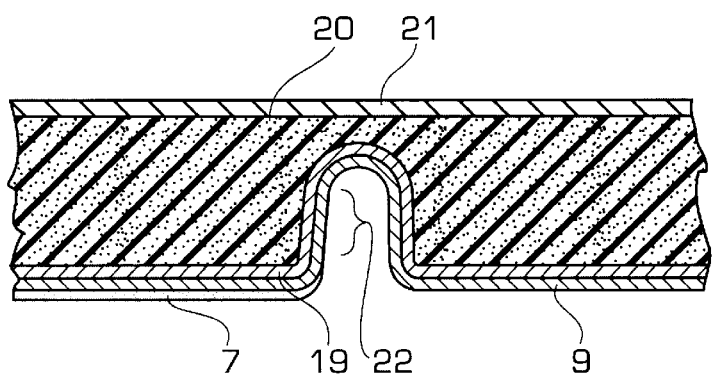
FIG. 13

METHOD AND SPRAY MOULD ASSEMBLY FOR MANUFACTURING AN ELASTOMERIC SKIN OF AT LEAST TWO ELASTOMERIC MATERIALS AND SUCH ELASTOMERIC SKIN

The present invention relates to a method for manufacturing an elastomeric skin comprising surface portions of at least two elastomeric materials, in particular two differently coloured polyurethane materials, by spraying said elastomeric materials against a mould surface, in which method a portion of said surface is shielded off by means of a mask having at least one edge delimiting said portion, a layer of a first elastomeric material is sprayed onto said surface and onto said edge said mask is removed, and a second elastomeric material is sprayed onto said portion of said mould surface.

A first object of the present invention is to provide a method for manufacturing an elastomeric skin of at least two elastomeric materials which allows to achieve an aesthetic visual parting line between the elastomeric materials, for example in order to produce dash-boards or other interior trim parts for the automotive industry in two or more different colours.

At present, different techniques are available for manufacturing elastomeric skins or moulded pieces made therefrom in two or more colours.

First of all, it is possible to manufacture two independently coloured elastomeric skins which are both further processed to a separate moulded piece which are subsequently assembled as one unit. This known method is, however, time-consuming and involves high costs.

A second known method consists in manufacturing two independently coloured elastomeric skins which are subsequently adhered together involving however the same drawbacks as mentioned hereabove.

According to the two-part mould technique, as disclosed in EP-A-0 386 818 of the present applicant, two differently coloured elastomeric materials are sprayed onto the two mould parts and subsequently pressed together. The complex mould construction technique requires in this case a high capital outlay. Furthermore, the finishing degree of the contact sides between the mould parts is very critical (as to tolerances and stresses) and may result in a two-colour parting line of an optically unacceptable quality.

Using lacquers to paint the different portions of the skins afterwards also does not provide a good solution since this would have a negative effect on the surface quality, in particular in the case of a leather structure, and would also involve a time-consuming process and high costs.

In order to solve the above mentioned problems of the known techniques, the present invention provides a method wherein use is made of the masking technique as indicated hereinabove and which is characterized in that said edge of the mask is placed on top of at least one upstanding edge on the mould surface delimiting together with said edge said portion of this mould surface and said first elastomeric material is sprayed onto one side of said upstanding edge.

In this method the transition between the different elastomeric materials is achieved on the upstanding edge of the mould surface or, when seen from the outside of the elastomeric skin, in a recess of the skin. The actual transition between the elastomeric materials is therefore hidden from view resulting in a nicely finished parting line between the different elastomeric materials and this in an industrially suited way.

A problem arising when using the masking technique for spraying viscous elastomeric materials, in particular polyurethane reaction mixtures, is the formation of filaments or threads of elastomeric material upon removing the mask due to the fact that the sprayed layer of elastomeric material extends from the mould surface up to the mask. Such filaments may arrive on that portion of the mould surface which was covered by the mask resulting in a scrap skin, especially when manufacturing the elastomeric skin from materials of contrasting colours, or in disturbances of the production process.

A further object of the present invention is therefore to solve this problem of filament formation in an industrially applicable way.

To this end, the method according to a second aspect of the invention is characterized in that upon spraying the first elastomeric material, said edge of the mask is maintained at a distance from said mould surface such as to avoid contact between the layer of said first elastomeric material sprayed onto the mould surface and said mask.

Due to the fact that there is no longer contact between the elastomeric material sprayed onto the mould surface and the mask, it will be clear that in this way the formation of elastomeric filaments upon removing the mask is avoided in a simple but efficient way.

The present invention also relates to spray mould assemblies for manufacturing an elastomeric skin comprising surface portions of at least two elastomeric materials. These spray mould assemblies permit more particularly to make elastomeric skins according to the method of the invention.

Moreover, the present invention relates to an elastomeric skin which is in particular made by the method.

Further details and particularities of the invention will become apparent from the following description of some particular embodiments of the method and of the spray mould assembly according to the present invention. This description is only given by way of example and does not limit the scope of the present invention. The reference numerals relate to the annexed drawings wherein:

FIGS. 3 to 9 show possible variant embodiments of the mask edge and of the mask structure itself;

FIGS. 10 to 12 show possible variant embodiments of the upstanding edges on the mould surface; and FIG. 13 shows a cross-section through a portion of a moulded piece comprising an elastomeric skin according to the invention, more particularly at the parting line between two elastomeric materials thereof.

In these different figures, the same reference numerals relate to the same or to analogous elements.

In the method according to the invention an elastomeric skin with surface portions of at least two elastomeric materials, in particular polyurethane elastomeric materials of different colours, is manufactured in a spray mould 1. The different steps of this method are illustrated in FIG. 1.

Figure 1:
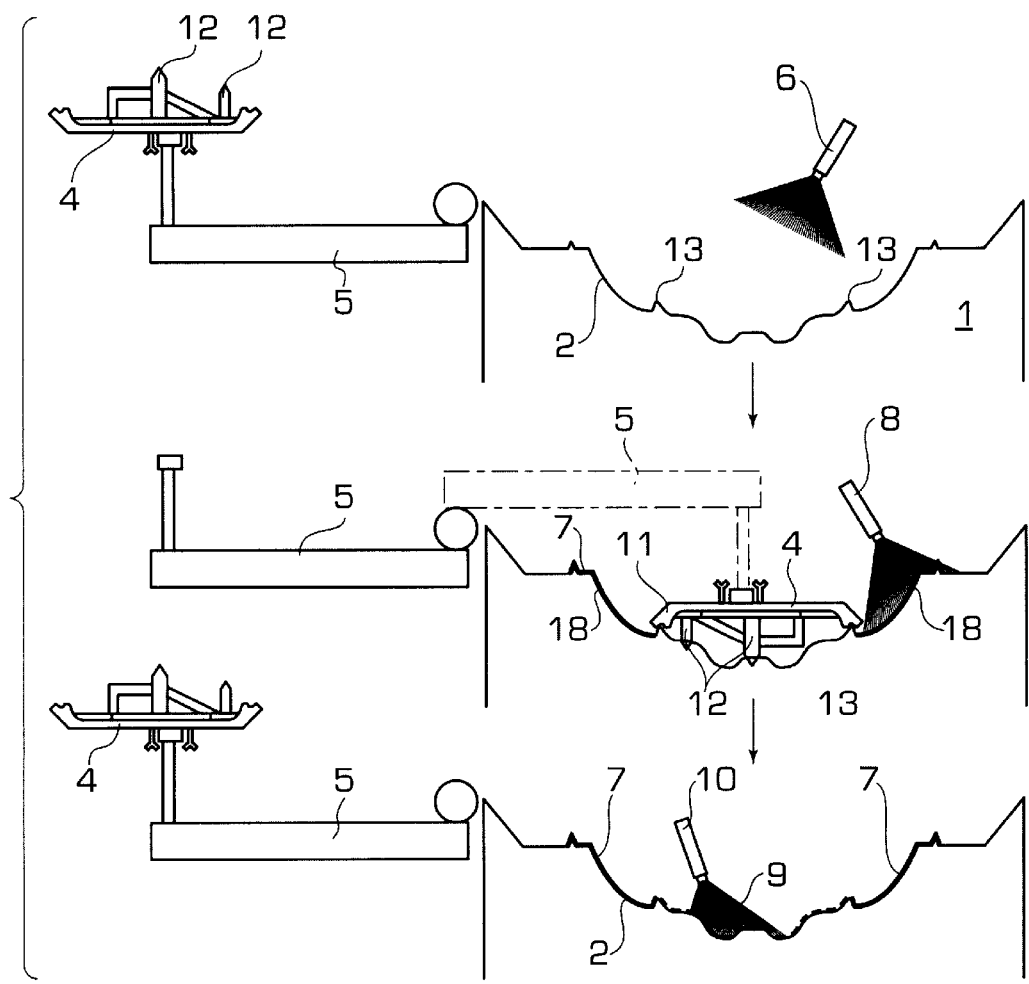
FIG. 1 shows schematically a cross-sectional view of a spray mould in different steps of the method according to the invention for manufacturing an elastomeric skin in this spray mould.

The spray mould 1 shown in FIG. 1 defines a mould surface 2 having a portion 3 which can be shielded off or covered by means of a mask 4. In a first step, the mask 4 is removed from the mould surface 2 for example by means of a swingable arm 5 and, if necessary, a mould release agent may be sprayed onto the entire mould surface 2 by means of a first spray nozzle 6. Then, the mask 4 is placed over the portion 3 of the mould surface 2 and a layer of a first elastomeric material 7 is sprayed, preferably after having returned the swingeable arm 5 to its initial position, by means of a second spray nozzle 8 onto the unmasked mould surface 2, delimited by cutting edges 18, and partially onto the mask 4. In a third step, the mask 4 is removed from the mould surface 2 and a second elastomeric material 9 is sprayed by means of a nozzle 10 to the remaining portion 3 of the mould surface 2 and partially onto the layer of first elastomeric material 7. Both elastomeric materials 7, 9 are usually applied in a layer of 0.1 to 5 mm, and preferably in a layer of 0.2 to 0.5 mm. Subsequently, a further layer of plastic material, whether coloured or not, can be applied against the back of the first elastomeric materials to obtain a skin of the desired thickness and the thus produced skin can be demoulded. This further layer may be a light-stable elastomeric layer like the first and second elastomeric materials or it may be a not light-stable elastomeric layer. The density of this layer may even be reduced through the use of blowing agents and may consequently consist of a foam layer for example as disclosed in WO 93/23237. This PCT patent application moreover discloses to apply further layers, such as rigid supports into the same mould 1 to manufacture an entire moulded piece therein. Of course, such a rigid support could also be applied afterwards.

In a first aspect of the method according to the present invention the edges 11 of the mask 4 delimiting the portion 3 of the mould surface 2 are maintained at a distance from the mould surface 2 such as to avoid contact between the layer of first elastomeric material 7 sprayed onto the mould surface and the mask 4. This can be achieved by means of the arm 5, and possibly through the intermediary of centring supports 12 engaging the mould surface preferably on less important portions of the skin which are to be covered later on or which are to be cut out.

According to a further aspect of the method according to the invention, the mask 4 is placed with its edges 11 on top of upstanding edges 13 on the mould surface 2, in particular at the parting line between the two elastomeric materials where this line remains visibly important. At the other locations, where the parting line between both elastomeric materials will be less important, for example hidden behind strips, such upstanding edges 13 may be omitted or reduced. When indicating that the edges 11 are placed on top of the upstanding edges 13, this does not mean that the mask 4 has to actually contact these edges 13 but could also be placed on a certain distance above these edges 13 as it will be clear hereinafter.

At the upstanding edges 13, the first elastomeric material 7 is sprayed onto one side thereof and partially onto the edges 11 of the mask 4, with a gap being preferably achieved between the elastomeric material 7 sprayed onto the upstanding edge 13 and the mask 4, as can be seen clearly in FIGS. 2 to 9.

Figure 2:
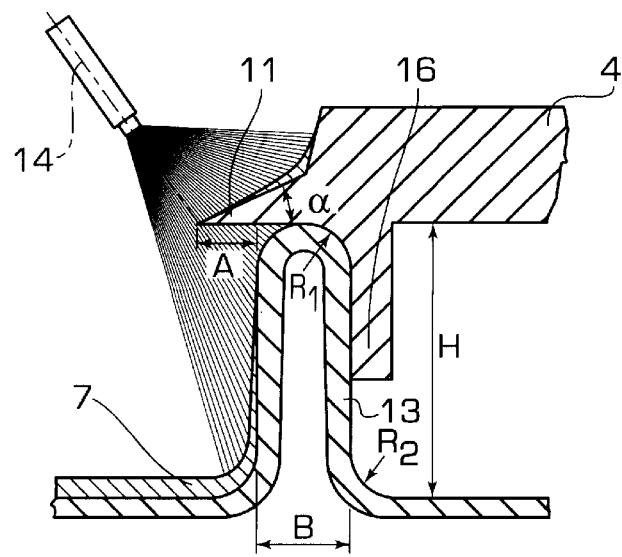
FIG. 2 shows, on a larger scale, an edge of the mask of FIG. 1 placed on top of an upstanding edge on the mould surface.

In the embodiment of FIG. 2, this gap is mainly achieved by the fact that the edge 11 of the mask 4 projects over the upstanding edge 13. In this way, the distance between the edge 11 of the mask 4 and the mould surface 2, measured in the spray direction 14 of the spray beam next to the edge 11, comprises in particular 0.5 to 20 mm, and more particularly 1 to 6 mm. The distance A over which the edge 11 projects over the upstanding edge 13 is usually smaller than the height H of the upstanding edge 13.

As shown in FIG. 3, the edge 11 of the mask 4 does not always have to project over the upstanding edges 13, but a distance between the edge 11 of the mask 4 and the mould surface 2 could possibly also be obtained in accordance with the first aspect of the invention by an appropriate curvature of the mould surface 2, more particularly of the top of the upstanding edges 13.

In order to avoid run off of elastomeric material 7 from the edge 11 of the mask 4, this edge 11 preferably tapers off towards its free extremity and has a top surface forming an angle $\alpha$ of 0 to 89° with a plane parallel to the mould surface 2, more particularly an angle $\alpha$ of 10 to 60° and preferably an angle $\alpha$ of about 30°.

After a few sprayings, the top surfaces of the edges 11 of the mask 4 have to be cleaned. In the preferred embodiment of FIG. 4, the portion of the mask 4 to be cleaned is considerably reduced by the presence of an additional cutting edge 15 on the edges 11. In this way, the surface of the mask 4 behind the cutting edge 15 does not have to be cleaned very regularly but the layer of elastomeric material sprayed thereon can be easily torn off once in a while.

Referring to FIGS. 1 to 4, the mask 4 may consist of a generally flat surface covering the portion 3 of the mould surface 2. However, as shown in FIGS. 5 to 9, the mask 4 may also consist of a plate placed in an upright position in particular onto the upstanding edges 13. This mask 4 does not necessarily have to be placed in line vertically on top of the upstanding edges 13, but could possibly be inclined, in particular away from the portion 3 of the mould surface 2 shielded off by the mask 4 as shown in FIG. 8. This situation arises for example in the case of complex moulds, the mould surface of which is not horizontally while the mask is to be positioned in a vertical direction.

In order to prevent first elastomeric material from penetrating between the mask 4 and the top of the upstanding edges 13, the bottom surface of the edges 11 of the mask 4 should be wide enough, depending on the inclination of this bottom surface. This latter surface may form for example an angle $\beta$ of 1 to 135° with an upright symmetry plane through the upstanding edges 13, more particularly an angle $\beta$ of about 90°. An example of an angle $\beta$ different from 90° can be seen in FIG. 6.

In FIGS. 2 to 9, a downward flange 16 is provided on the bottom surface of the mask edges 11, along the upstanding edges 13, on the side of the portion 3 of the mould surface to be masked, for permitting to achieve an accurate positioning of the mask 4. Further, these downward flanges 16 help to prevent small spray particles, which may possibly be subjected to turbulences, from penetrating between the mask 4 and the upstanding edges 13, especially on places where the edges 11 of the mask 4 possibly do not fit accurately onto the upstanding edges 13 as shown in FIG. 7. As shown in FIGS. 8 and 9, the flanges 16 do not necessarily have to be parallel to the upstanding edges 13 so that the mask 4 can be removed in other directions, especially in the case of complex moulds as mentioned hereinabove with reference to FIG. 8.

In the embodiment shown in FIG. 6, these downward flanges 16 are replaced by a recess 17 in the bottom surface of the mask edges 11. FIG. 7 shows a combination of a recess 17 and a downward flange 16. The length of the downward flanges 16 is of course limited by the height of the upstanding edges 13.

The height H of the upstanding edges 13 can vary within wide limits but usually between 1 and 20 mm and more particularly between 2 and 8 mm. Preferably, this height H comprises 3 to 5 mm.

The width of the edges 13, measured at about half the height thereof, comprises usually at least 0.5 mm, more particularly 1 to 5 mm and preferably about 2 to 3 mm. This width, determining the corresponding width of the recess in the elastomeric skin, will have an important influence, just as the height of the upstanding edges, on the aesthetic appearance of the parting line between the different elastomeric materials or colours of the produced skin.

In view of obtaining a sufficiently thick layer of second elastomeric material on top of the upstanding edges 13, the top thereof is advantageously curved with a curvature radius R1 which is preferably equal to about half of their width. This curvature radius comprises for example 1 mm. Different possible shapes of the upstanding edges 13 are shown schematically in FIGS. 10 to 12, the upstanding edge shown in FIG. 11 fitting more particularly well to the masks 4 shown in FIGS. 8 and 9. These FIGS. 10 and 12 also show that the base of the upstanding edges 13 may be angular or curved according to a curvature radius R2 which may be different from the curvature radius R1 of the top of the upstanding edges 13. The curvature radius R2 is generally comprised between 0 and H-R1 or even between 0 and H on the side of the masked portion 3. It will be clear that both the top and the base of the upstanding edges 13 may be curved irregularly.

As to the elastomeric materials used in the method according to the present invention, reference is made in particular to the light-stable polyurethane elastomeric materials disclosed in EP-A-0379246 of the present applicant, which is incorporated herein by way of reference. Further, reference is made to EP-A-0303305, also in the name of the present applicant, with respect to the possible spray technique and spray nozzles for applying the different elastomeric layers. This EP-patent application is also incorporated herein by way of reference.

Finally, reference is made to the technique described in WO 93/23237 in the name of the present applicant, which can be used to make moulded pieces consisting entirely of polyurethane. These moulded pieces comprise in particular an elastomeric skin and a foam backing layer, both of particular thicknesses, in order to achieve a so-called leather touch. In this respect, the present invention enables therefore to manufacture a synthetic leather skin of differently coloured portions. The above PCT-patent application is, in view of these advantageous effects, also incorporated herein by way of reference.

The following example is given to illustrate the present invention. It will however be clear that the skilled person will be able to conceive many different examples on the basis of the hereinabove given description of the invention and on the information contained in the patent applications referred to herein-above. In particular, it will be clear, that skins comprising more than two differently coloured elastomeric materials can be considered.

EXAMPLE

In this example, an elastomeric polyurethane skin for a dash-board was made in an open spray mould as shown in FIGS. 1 and 2. The mould surface 2 was formed by a galvanoplate having a leather grain. The upstanding edges 13 had a height H of 5 mm, a width B of 3 mm and a top curved according to a radius R1 of 1.5 mm. The base of the raised edges 13 was curved also over a curvature radius R2 equal to 1.5 mm.

In a first step, the mask 4 being removed from the mould surface 2, a release agent on the basis of silicone, wax and solvent was sprayed onto the entire mould surface 2. Subsequently, the mask 4 was placed on the edges 13 to cover portion 3 of the mould surface 2.

In this position, a first elastomeric material 7, in particular a polyol-isocyanate reaction mixture was sprayed on the uncovered mould surface and partially onto the mask 4, at a flow rate of 25 g/sec., the polyol component pressure being 150 bars and the pressure of the isocyanate component being 100 bars.

| 1. Characteristics of the polyol (first component) | |
|---|---|
| Formulation in parts by weight | |
| Polyether-triol which is obtained by adding propylene oxide and ethylene oxide to glycerin as an initiator (OH index: 35; primary OH radical content: 80%) | 100 |
| Ethylene glycol | 5 |
| N'N-dimethylbutanediamine | 5 |
| Lead octoate (33% lead metal) | 0.7 |
| Black colour paste | 5 |
| | 115.7 |

| 2. Characteristics of the isocyanate (second component) | |
|---|---|
| Formulation in parts by weight | |
| Quasi-prepolymer (100 parts isophorone-diisocyanate + 13.28 parts dipropylene glycol (final content of NCO groups: 26%): | 67.1 |
| dimethylstanodineodecanoate | 1 |
| | 68.1 |

$$\text{Ratio:} \frac{\text{polyolcomponent}}{\text{isocyanatecomponent}} = \frac{115.7}{68.1} = 1.7$$

As soon as the first polyurethane reaction mixture was sprayed onto the mould surface 2, the mask 4 was removed and a second polyurethane reaction mixture 9, having the same composition as the first one, except for the presence of 5 parts of grey colour paste instead of black colour paste in the polyol component, was sprayed onto the remaining portion 3 of the mould surface 2 and partially onto the layer of first reaction mixture. This second reaction mixture is preferably applied when the first one is still sticky to obtain a good adhesion between both layers.

In the present example, both elastomeric materials were applied in a layer of about 0.4 mm. Subsequently, a backing layer of a further elastomeric material 19 was sprayed against the back of the first and second elastomeric materials to obtain a total skin thickness of about 1 mm. This backing layer 19 was achieved by means of a light-stable uncoloured polyurethane reaction mixture having the same composition as the first and the second polyurethane reaction mixture, the polyol component containing however no colour paste.

The thus produced skin was processed further to a dash-board by applying a polyurethane foam layer 20 against the back thereof and a rigid support 21.

Referring to FIG. 13, the obtained two-colour skin had a nicely finished parting line between the differently coloured portions since the actual transition between the different materials in the recess 23 at this parting line, forming in fact a gradual transition zone 22, was well hidden from view. If desired, this recess can of course be filled up afterwards or be closed by pressing and/or gluing the sides thereof together.

What is claimed is:

1. A method for manufacturing an elastomeric skin with surface portions of at least two elastomeric materials by spraying said elastomeric materials against a mould surface, in which method a portion of said mould surface is shielded off by means of a mask having at least one edge delimiting said mould surface portion, a layer of a first elastomeric material is sprayed onto said mould surface and onto said mask edge, said mask is removed, and a layer of a second elastomeric material is sprayed onto said mould surface portion, characterized in that said mask edge is placed on top of at least one upstanding edge on the mould surface, said upstanding edge delimiting together with said mask edge said mould surface portion and said first elastomeric material is sprayed onto one side of said upstanding edge.

2. A method according to claim 1, characterized in that said first elastomeric material and said second elastomeric material are of different colors.

3. A method according to claim 1 or 2, characterized in that upon spraying said first elastomeric material, said mask edge is maintained at a distance from said mould surface to avoid contact between the layer of said first elastomeric material sprayed onto said mould surface and said mask.

4. A method according to claim 1, characterized in that a plastic backing layer is applied against said layers of elastomeric materials.

5. A spray mould assembly for manufacturing an elastomeric skin with surface portions of at least two elastomeric materials comprising a mould, defining a mould surface, and at least one mask for shielding off a portion of said mould surface and having at least one edge delimiting said mould surface portion, characterized in that said mould surface comprises at least one upstanding edge delimiting together with said mask edge said mould surface portion, said mask edge being arranged to be placed on top of said upstanding edge.

6. A spray mould assembly according to claim 5, characterized in that said mask edge is arranged to project over said upstanding edge of said mould surface when placed on top thereof.

7. A spray mould assembly according to claim 5 or 6, characterized in that said mask edge has a bottom surface forming an angle β of 1 to 135° with an upright symmetry plane through the upstanding edge.

8. A spray mould assembly according to claim 7, wherein the formed angle β is from 70 to 110°.

9. A spray mould assembly according to claim 5, characterized in that said upstanding edge has a height (H) of 1 to 20 mm.

10. A spray mould assembly according to claim 9, wherein said upstanding edge has a height of from 2 to 8 mm.

11. A spray mould assembly according to claim 9, wherein said upstanding edge has a height of from 3 to 5 mm.

12. A spray mould assembly according to claim 5, characterized in that said upstanding edge has a width, measured at about half the height thereof, of at least 0.5 mm.

13. A spray mould assembly according to claim 12, wherein the width is from 1 to 5 mm.

14. A spray mould assembly according to claim 12, wherein the width is from 2 to 3 mm.

15. A spray mould assembly according to claim 5, characterized in that said upstanding edge has a curved top with a curvature radius equal to about half of its width.

16. A spray mould assembly according to claim 5, characterized in that said mask edge has a top surface forming an angle (α) of 0 to 89° with a plane parallel to the mould surface.

17. A spray mould assembly according to claim 16, wherein the angle α is from 10 to 60°.

18. A spray mould assembly according to claim 5, characterized in that said mask edge is provided with an additional cutting edge.

19. A spray mould assembly for manufacturing an elastomeric skin with surface portions of at least two elastomeric materials comprising a mould, defining a mould surface, and at least one mask for shielding off a portion of said mould surface and having at least one edge delimiting said portion, said mould surface comprising at least one upstanding edge, said assembly comprising means for maintaining said mask edge at a distance from said mould surface upon spraying said first elastomeric material to avoid contact between said layer of said first elastomeric material sprayed onto said mould surface and said mask, said mask and said at least one upstanding edge together delimiting said shielded off portion of said mould surface.

20. A spray mould assembly according to claim 19, characterized in that said means are arranged for maintaining said mask edge at a distance, measured in the spray direction, of between 0.5 and 20 mm from said mould surface.

21. A spray mould assembly according to claim 20, wherein the distance is between 1 and 6 mm from said mould surface.

22. An elastomeric skin with surface portions of at least two elastomeric materials and made by the method according to claim 3, wherein said first and second elastomeric materials form a first and respectively a second sprayed layer, and wherein said first and second elastomeric materials are adhered to each other along a parting line which is formed by a gradual transition zone between these materials and at least a portion of which is located in an outer recess of the elastomeric skin, the first and second layers being curved inwards into said outer recess.

* * * * *

UNITED STATES PATENT AND TRADEMARK OFFICE
CERTIFICATE OF CORRECTION

PATENT NO. : 6,071,619
DATED : June 6, 2000
INVENTOR(S) : Hugo De Winter

It is certified that error appears in the above-identified patent and that said Letters Patent is hereby corrected as shown below:

Substitute Fig. 2 below for Fig. 2 of the patent as printed.

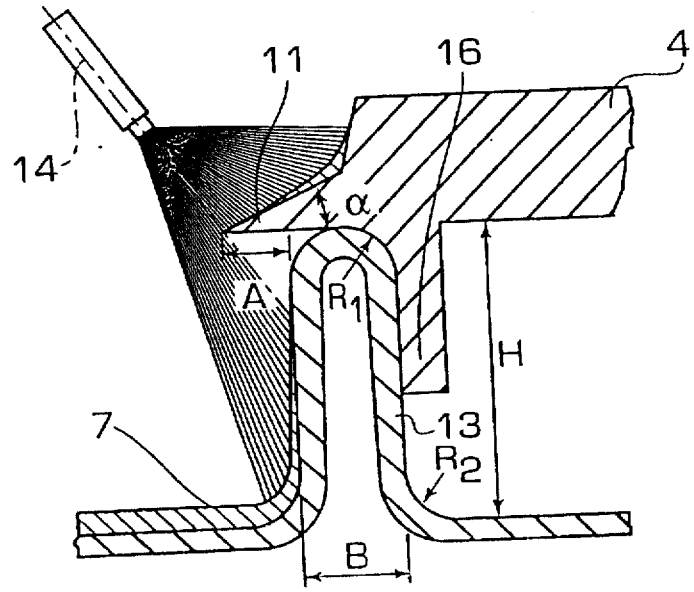

FIG. 2

UNITED STATES PATENT AND TRADEMARK OFFICE
CERTIFICATE OF CORRECTION

PATENT NO. : 6,071,619
DATED : June 6, 2000
INVENTOR(S) : Hugo De Winter

It is certified that error appears in the above-identified patent and that said Letters Patent is hereby corrected as shown below:

Substitute Fig. 13 below for Fig. 13 of the patent as printed.

FIG. 13

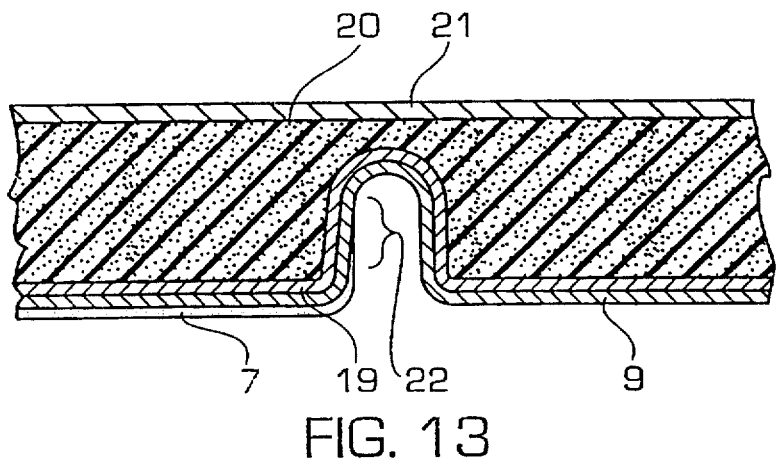

FIG. 13

Signed and Sealed this

Thirtieth Day of October, 2001

Attest:

NICHOLAS P. GODICI
Attesting Officer   Acting Director of the United States Patent and Trademark Office